United States Patent [19]

Kawai et al.

[11] Patent Number: 5,101,285
[45] Date of Patent: Mar. 31, 1992

[54] PHOTOELECTRIC CONVERSION DEVICE HAVING AN IMPROVED ILLUMINATING SYSTEM AND INFORMATION PROCESSING APPARATUS MOUNTING THE DEVICE

[75] Inventors: Tatsundo Kawai, Kanagawa; Tetsuya Shimada, Zama; Masashi Kitani, Yokohama; Osamu Hamamoto, Hiratsuka, all of Japan

[73] Assignee: Canon Kabushiki Kaisha, Tokyo, Japan

[21] Appl. No.: 555,761

[22] Filed: Jul. 23, 1990

[30] Foreign Application Priority Data

Jul. 24, 1989 [JP] Japan .................................. 1-191101
Nov. 21, 1989 [JP] Japan .................................. 1-302673

[51] Int. Cl.$^5$ ............................................. H04N 1/40
[52] U.S. Cl. .................................. 358/471; 358/482; 250/208.1
[58] Field of Search ................. 358/213.11, 213.13, 358/482, 483, 475, 471; 357/30 L, 30 R; 250/208.1

[56] References Cited

U.S. PATENT DOCUMENTS

| | | | |
|---|---|---|---|
| 3,544,713 | 12/1070 | Case et al. | 358/482 |
| 4,482,804 | 11/1984 | Oritsuki et al. | 250/211 J |
| 4,553,036 | 11/1985 | Kawamura et al. | 250/208.1 |
| 4,680,644 | 7/1987 | Shirato et al. | 358/474 |
| 4,737,896 | 4/1988 | Mochizuki et al. | 362/301 |
| 4,908,718 | 3/1990 | Shimada | 358/494 |
| 4,947,261 | 8/1990 | Ishikawa et al. | 358/471 |
| 4,977,313 | 12/1990 | Nagata et al. | 358/482 |

Primary Examiner—Edward L. Coles, Sr.
Assistant Examiner—Edward Lefkowitz
Attorney, Agent, or Firm—Fitzpatrick, Cella, Harper & Scinto

[57] ABSTRACT

A photoelectric conversion device includes a photosensor including a plurality of photoelectric conversion elements and a substrate having a transparent portion for transmitting light for illuminating an original bearing information and provided with the plurality of photoelectric conversion elements, and a light source for emitting light for illuminating the original in which a plurality of light-emitting sources are arranged. The device further includes a light diffuser between the photosensor and the light source.

16 Claims, 19 Drawing Sheets

FIG. I (A)
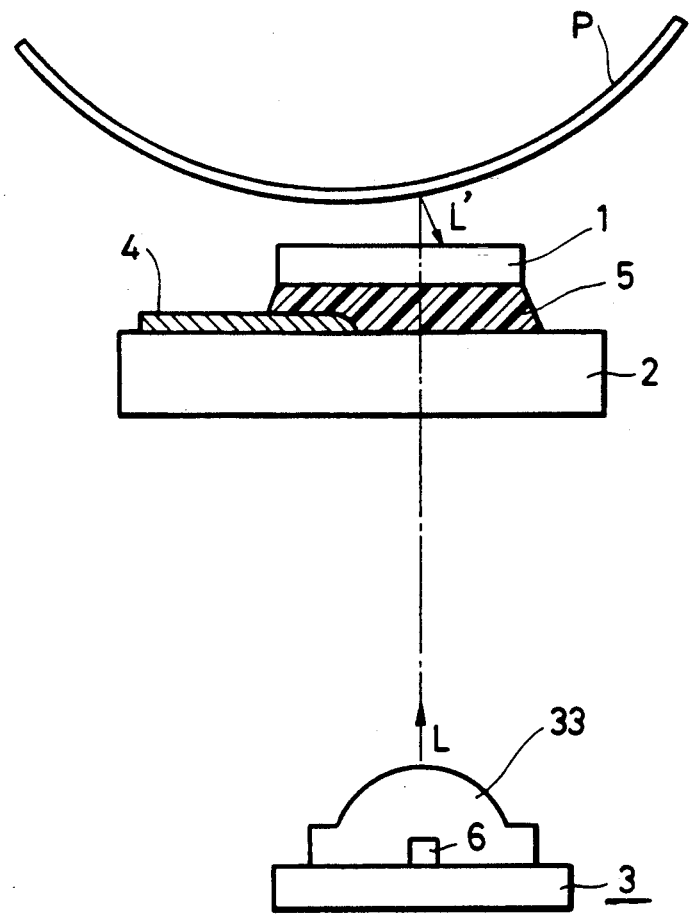

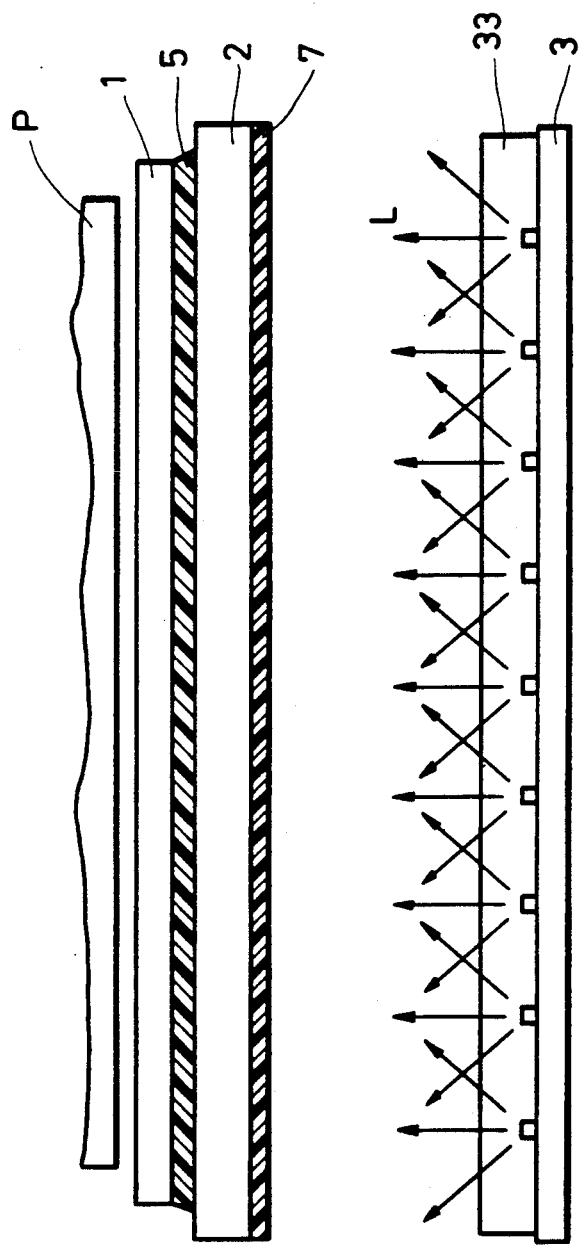
F I G. 5 (B)

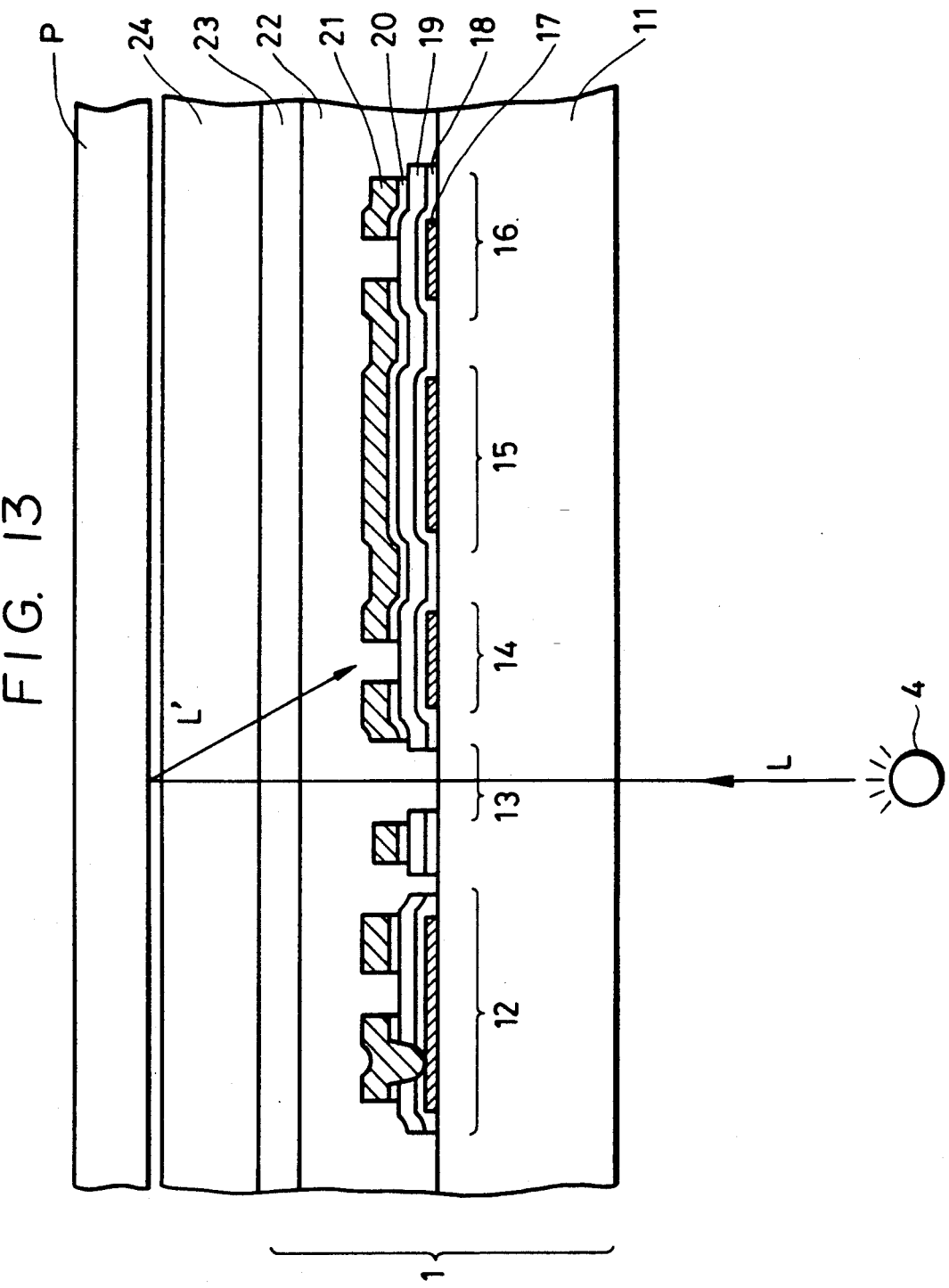

PHOTOELECTRIC CONVERSION DEVICE HAVING AN IMPROVED ILLUMINATING SYSTEM AND INFORMATION PROCESSING APPARATUS MOUNTING THE DEVICE

BACKGROUND OF THE INVENTION

1. Field of the Invention

This invention relates to a photoelectric conversion device, and more particularly, to a photoelectric conversion device used as an input unit for a facsimile, an image reader, a digital copying machine, an electronic blackboard or the like.

2. Description of the Related Art

Recently, long line sensors having optical systems with one-to-one magnification ratio have been developed as photoelectric conversion devices for the purpose of providing small and high-performance facsimiles, image readers, and the like.

Furthermore, for the purpose of providing small and inexpensive devices, photoelectric conversion devices have also been proposed in which a sensor directly detects light reflected from an original via a transparent spacer made of glass or the like without using a fiber lens array with one-to-one magnification ratio.

FIGS. 1(A) and 1(B) schematically show an example of a photoelectric conversion device. FIG. 1(A) is a schematic cross-sectional view of the photoelectric conversion device, as seen from the main scanning direction of a photoelectric conversion element array. FIG. 1(B) is a schematic cross-sectional view of the device, as seen from the subscanning direction of the photoelectric conversion element array.

In FIGS. 1(A) and 1(B), a transparent sensor substrate 1 includes photoelectric conversion elements (not shown) formed on a transparent substrate, made of glass or the like, by a semiconductor process or the like, and an illuminating window (not shown). A transparent mounting substrate 2 includes an interconnection wiring member 4 formed on a transparent substrate, made of glass or the like, by a thick-film printing method, a photolithographic method or the like. The interconnection member 4 electrically connects the transparent sensor substrate 1 to a driving circuit unit (not shown) provided on the transparent mounting substrate 2. The transparent sensor substrate 1 is bonded on the transparent mounting substrate 2 by an adhesive layer 5. A light source 3 for emitting light for illuminating an original P comprises an LED array consisting of a plurality of LED chips 6 arranged in the form of an array and a light-condensing member 33 provided thereon.

The reading position of the original P, the arranged position of the illuminating window in the transparent sensor substrate 1 and the optical axis of the light source 3 in the direction of the array are set to positions which exist within a vertical plane descending from the reading position of the original P, as shown by arrow L.

Illuminating light L from the light source 3 is projected onto the original P after passing through the transparent mounting substrate 2 and the illuminating window within the transparent sensor substrate 1. Information light reflected from the original P is incident upon the photoelectric conversion elements on the transparent sensor substrate 1, and is subjected to photoelectric conversion by the photoelectric conversion elements. The converted signal is output to the outside as an image signal.

FIGS. 1(C) and 1(D) show a modified example of the photoelectric conversion device shown in FIGS. 1(A) and 1(B). The modified device differs from the device shown in FIGS. 1(A) and 1(B) only in that there is no light-condensing member 33 provided in the light source 3.

However, in attempts to provide a further inexpensive and smaller device, it has become clear that the above-described photoelectric conversion devices have the following technical problems.

As a means for providing an inexpensive photoelectric conversion device, it is possible to reduce the number of the LED chips and thus to reduce the cost of the light source.

When the number of the LED chips are reduced, illuminance on the surface of the original is reduced, causing uneven illuminance. This substantially deteriorates the quality of an image, especially when a white original is read.

In order to reduce the uneven illuminance, it is possible to increase the distance between the LED array and the surface of the original. This approach, however, is by no means preferable, since the illuminance substantially decreases and the photoelectric conversion device becomes large.

On the other hand, when an original is illuminated by the LED array, much light beams nearly perpendicular to the surface of the original are incident upon the surface of the original situated just above the LED chips, but much light beams inclined relative to the surface of the original are incident upon the surface of the original situated at positions above positions between the LED chips. That is, when an original is illuminated by a so-called pseuodo-linear light source in which a plurality of light-emitting sources are arranged, a directional property which the light beams of the illuminating light have causes uneven directional property of the light beam within the area of the surface of the original. If the illuminating light has such a directional unevenness, the quality of an image is substantially deteriorated when a black original is read.

In order to prevent the directional unevenness in the illuminating light, it is possible to use a linear light source, such as a fluoroscent lamp. The use of such a light source, however, finds difficulty in providing an inexpensive and small device, since such a light source generally has large external dimensions and is apt to be broken, and the application of an AC voltage, of high voltage and high frequency in some cases, converted from a DC voltage is needed in order to light the light source.

The above-described technical problems will now be explained in detail.

FIG. 2 shows image signal outputs from the photoelectric conversion device shown in FIG. 1 when a white original and a black original are read.

According to FIG. 2, it can be understood that an image signal output (a) when a white original is read is nearly uniform over the width of the original, while an image signal output (b) when a black original is read has variations with a large period which corresponds to the arranged pitch of the LED chips. Since the magnitude of the variations in the image signal output when the black original is read is as small as a few % compared with the magnitude of the image signal output when the white original is read, there is practically no problem when the photoelectric conversion device shown in FIG. 1 is used for reading two, i.e., black and white, values.

When the device is used for reading multiple gradations, however, although the magnitude of variations in an image output when a black original is read is small, a noise corresponding to the arranged pitch of the LED chips appears as stripes in a reproduced output image corresponding to the black original in some setting of slice levels for providing the color density of the image of the original with multiple values. This deteriorates the picture quality.

This problem, which has been found by the inventors of the present invention, is an inherent technical problem which arises when a so-called pseudo-linear light source, in which a plurality of light-emitting sources are arranged in order to provide uniform illuminance on the surface of an original, is combined with a so-called lensless photoelectric conversion device which directly detects light reflected from the original without using a lens array. In other words, the so-called lensless photoelectric conversion device has light source illuminating the original through the transparent substrate including the photoelectric conversion elements. Accordingly, this problem does not arise when a linear light source, such as a fluorescent lamp, is used.

Before explaining embodiments according to the present invention, the above-described problem will be explained by reference to the accompanying drawings.

Even in a pseudo-linear light source such as an LED array or the like, the amounts of light beams illuminating the surface of an original are nearly identical at a position just above an LED chip and at a position above a position between adjacent LED chips.

When a white original, for example, is illuminated by an LED array, illuminating light beams L are reflected from an original P, and reflected light beams L' are incident upon photoelectric cnversion elements 8, as shown in FIGS. 3(A) and 3(B). There is also shown a transparent spacer 9.

When the white original is illuminated, the reflected light L' has a diffused-light component which randomly diffuses with not at all depending on the incident angle of a light beam upon the white original and a specular-reflection-light component which performs specular reflection depending on the incident angle of a light beam.

FIG. 3(A) shows the behavior of reflected light incident upon photoelectric conversion elements situated just above LED chips.

As shown in FIG. 3(A), very few specular-reflection-light component is included within the component of the reflected light incident upon the photoelectric conversion elements situated just above the LED chips. Since the illuminating light L passes through the illuminating window in the transparent sensor substrate 1 and illuminates the original P with an angle almost perpendicular to the original P, the specular-reflection-light component L' passes again through the illuminating window and goes to the outside.

FIG. 3(B) shows the behavior of reflected light incident upon photoelectric conversion elements situated at positions above positions between adjacent LED chips.

As shown in FIG. 3(B), both the diffused-light component and the specular-reflection-light component are incident upon the photoelectric conversion elements situated at positions above positions between the LED chips.

Accordingly, if a white original is illuminated by a pseudo-linear light source, the amount of light beams incident upon photoelectric conversion elements situated just above LED chips becomes smaller by an amount of the specular-reflection-light component. However, since the diffused-light component is much larger than the specular-reflection-light component in the component of the light reflected from the surface of the white original, variations in the amount of light beams incident upon the photoelectric conversion elements practically cause no problem.

On the other hand, when a black original is illumunated by a pseudo-linear light source, since illuminating light beams are absorbed on the surface of the original and are hardly diffused, as shown in FIGS. 4(A) and 4(B), the specular-reflection-light component is emphasized.

As shown in FIG. 4(A), since the illuminating light is absorbed by the black original, the diffused light and the specular-reflection-light component L' reflected are hardly incident upon photoelectric conversion elements situated just above LED chips.

To the contrary, as shown in FIG. 4(B), the specular-reflection-light component is incident upon photoelectric conversion elements situated at positions above positions between the LED chips. This is because a black original is generally prepared by printing black ink on white paper, and it is difficult to prevent the generation of the specular-reflection-light component from the surface of the black ink. Thus, when a black original is read, variations in the amount of light beams incident upon photoelectric conversion elements are further increased.

SUMMARY OF THE INVENTION

It is an object of the present invention to provide a photoelectric conversion device and an information processing apparatus which are less expensive, more compact and have higher performance than ever.

It is a further object of the present invention to provide a photoelectric conversion device and an information processing apparatus in which excellent linear illuminating light can be obtained even if the number of light-emitting sources is decreased.

It is a still further object of the prensent invention to provide a photoelectric conversion device and an information processing apparatus having improved illuminating systems in which subtantially uniform information light can be obtained for any original to be read.

It is still another object of the prensent invention to provide a photoelectric conversion device comprising a photosensor comprising a plurality of photoelectric conversion elements and a substrate having a transparent portion for transmitting light for illuminating an original bearing information and provided with the plurality of photoelectric conversion elements, and a light source for emitting light for illuminating the original in which a plurality of light-emitting sources are arranged, the device further comprising light diffusing means between the photosensor and the light source, and to provide an information processing apparatus comprising the photoelectric conversion device, conveying means for conveying the original, and control means for controlling the photoelectric conversion device and the conveying means.

BRIEF DESCRIPTION OF THE DRAWINGS

FIG. 13 is a schematic cross-sectional view showing a photosensor unit which is suitable for a photoelectric conversion device according to the present invention.

DETAILED DESCRIPTION OF THE PREFERRED EMBODIMENTS

The present invention will now be explained in detail by reference to the drawings.

Figure 5:
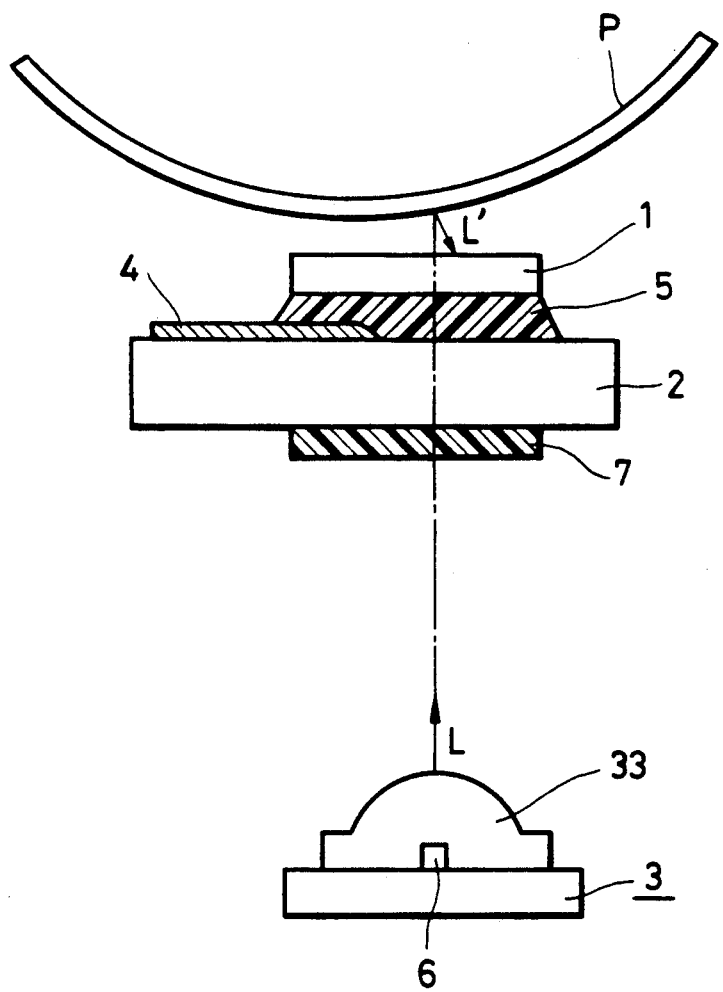
FIGS. 5(A) and 5(B) are schematic cross-sectional views of a photoelectric conversion device according to the present invention.

FIGS. 5(A) and 5(B) are schematic cross-sectional views showing a photoelectric conversion device according to the present invention. FIG. 5(A) is a schematic cross-sectional view of the photoelectric conversion device of the present invention, as seen from the main-scanning direction of a photoelectric conversion element array. FIG. 5(B) is a schematic cross-sectional view of the device, as seen from the subscanning direction of the photoelectric conversion element array.

Figure 1B:
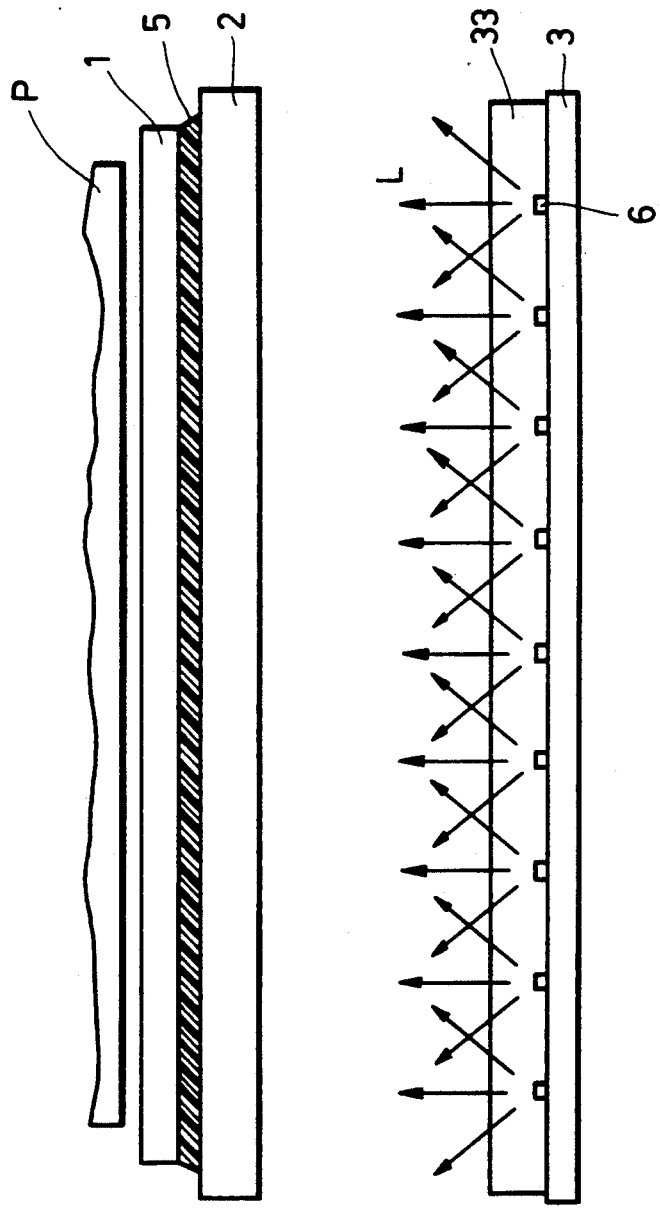
FIGS. 1(A) and 1(B) are schematic cross-sectional views showing an example of a photoelectric conversion device.
Figure 1:
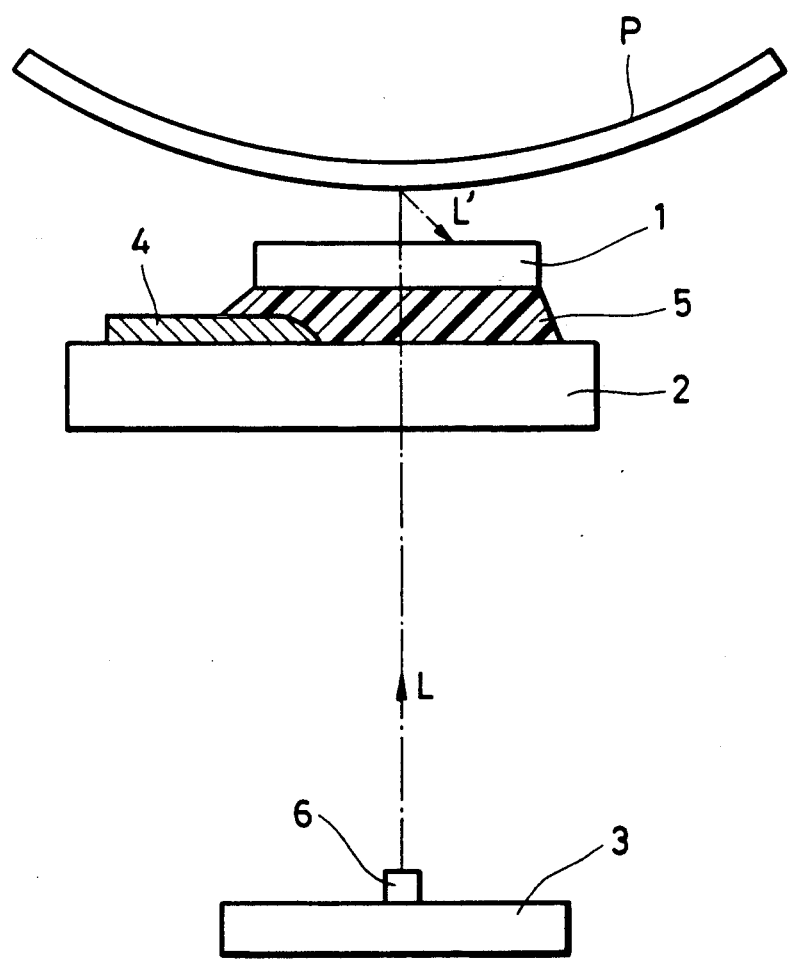
FIGS. 1(C) and 1(D) are schematic cross-sectional views showing another example of a photoelectric conversion device.
Figure 1:
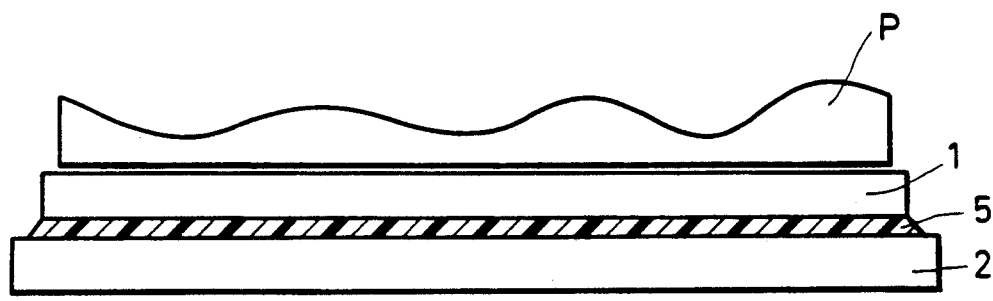
Figure 1:
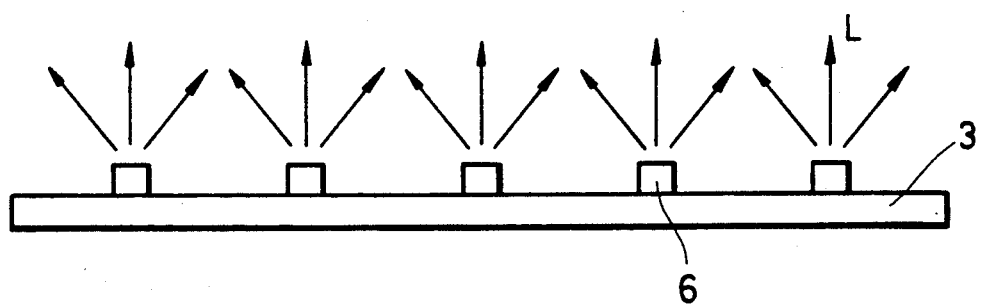
Figure 2:
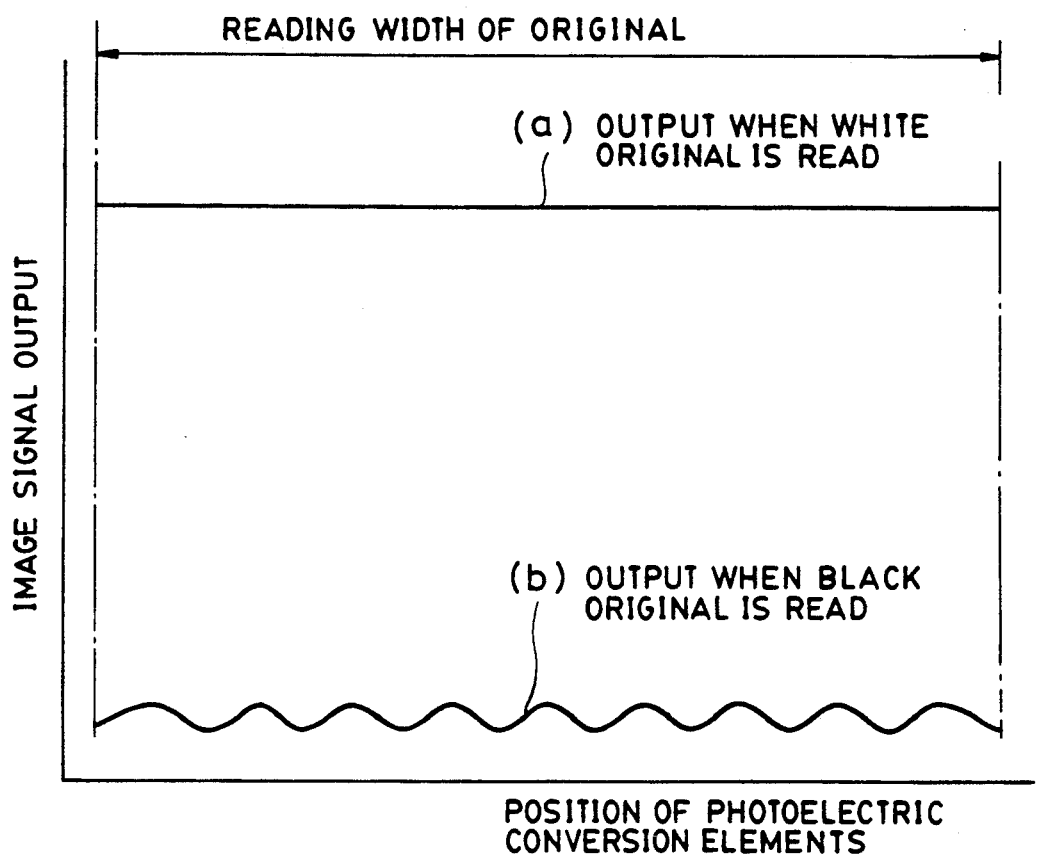
FIG. 2 is a graph for explaining image signal outputs.
Figure 2:
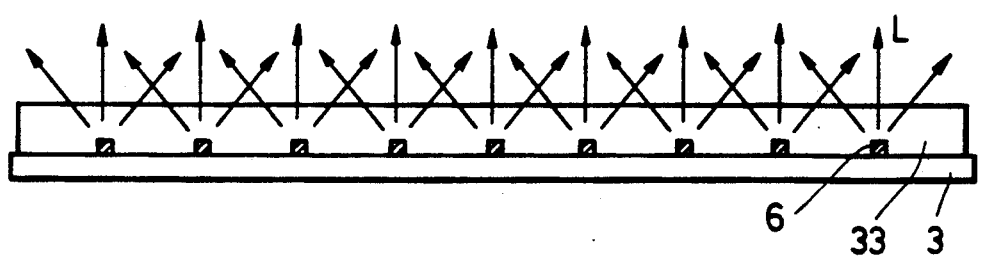
Figure 3A:
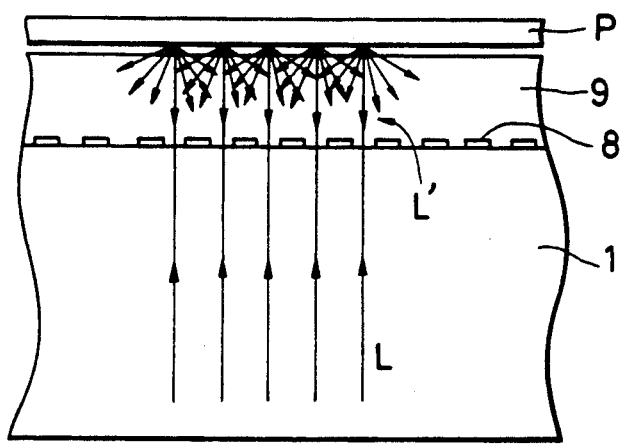
FIGS. 3(A) and 3(B) are schematic diagrams for explaining illuminating light.
Figure 3B:
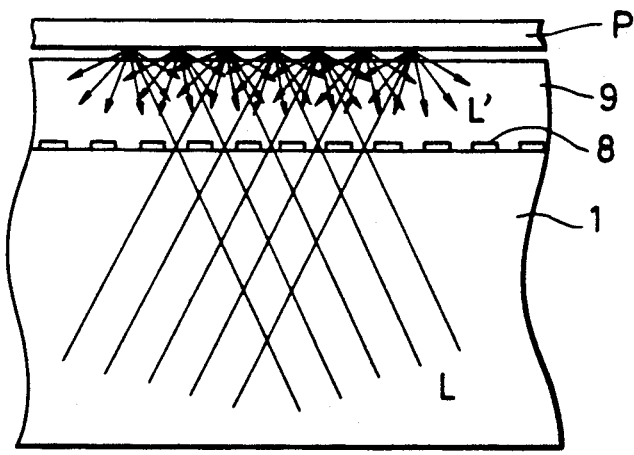
Figure 4:
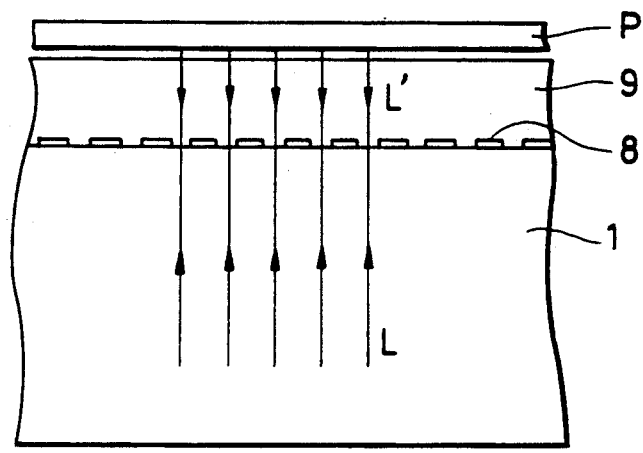
FIGS. 4(A) and 4(B) are schematic diagrams also for explaining illuminating light.
Figure 4:
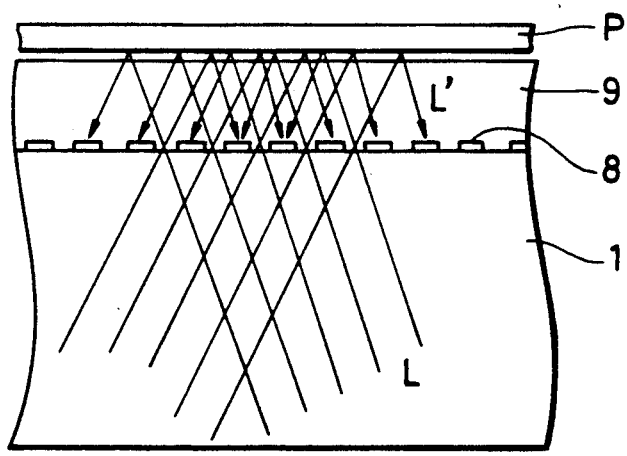

In FIGS. 1(A) and 1(B), a transparent sensor substrate 1 includes a photoelectric conversion element array formed on a transparent and insulating substrate made of fused quartz, silica glass, borosilicate glass or the like by a semiconductor process or the like.

A transparent mounting substrate 2 includes an interconnection wiring member 4, made of Ag, Ag-Pd, Ag-Pt, Au or the like formed by a thick-film printing method, or Al, Cu, Mo, ITO (indium-tin oxide) or the like formed by a thin-film forming method and photolithography, provided on a transparent and insulating substrate made of fused quartz, silica glass, borosilicate glass, soda glass, acrylic resin (which may be provided with a protective layer made of $SiO_2$ or the like for preventing elution and diffusion of alkali elements) or the like.

The interconnection member 4 connects the photoelectric conversion element array to a driving circuit unit (not shown). The transparent sensor substrate 1 is bonded on the transparent mounting substrate 2 by an adhesive layer 5. For the adhesive layer 5, a transparent adhesive of a room-temperature-curable, heat-curable or photo-curable type or the like, made of a silicone-type, acryl-type, epoxy-type resin or the like may be suitable used. It is more preferred to use a material having coefficient of thermal expansion and refractive index which are close to those of each of the transparent sensor substrate 1 and the transparent mounting substrate 2. The transparent sensor substrate 1 and the interconnection member 4 of the transparent mounting substrate 2 are electrically connected together using wire bonding, soldering or the like.

A light source 3 is a pseudo-linear light source comprising an LED array in which a plurality of light-emitting sources consisting of LED chips 6 are linearly arranged. A condenser lens 33 serves as a light-condensing member for condensing light in the sub-scanning direction.

The reading position of the original P, the arranged position of the illuminating window in the transparent sensor substrate 1 and the optical axis of the light source 3 are set to positions which exist within a vertical plane descending from the reading position of the original P.

As described above, although, in a pseudo-linear light source such as an LED array or the like, directional properties of illuminating light beams are different between positions just above light-emitting sources such as LED chips and positions above positions between adjacent light-emitting sources, the problems thereby caused are solved by providing a light diffusing means.

For the light diffusing means, any material may be used provided that the material can diffuse illuminating light in the main-scanning direction, that is, in the arranged direction of the LED array.

More specifically, it is preferred to use a transparent member provided with uneven surface (for example the surface having projections and recesses), because it can be easily made and so coincides with the basic technical conception of low cost.

Any shape of projections and recesses, either regular or irregular in the main-scanning direction, may be adopted, provided that it achieves the object to diffuse light.

For example, a member made of an organic material, such as polyester, polycarbonate, acrylic resin or the like, or a member made of an inorganic material, such as glass, may be used.

The shape of the member may also be properly selected according to user's desire. For example, the shape of a flexible film, or the shape of a rigid plate may be adopted.

The projections and recesses may be provided by processing the above-described transparent member by sandblasting or the like, or may be formed using a mold having corresponding projections and recesses.

It is preferred to provide such a light diffusing means between the photoelectric conversion element array and the light source. In the FIG. 5 example, a light diffusing means 7 is disposed between the transparent mounting substrate 2 and the light source 3.

In order to obtain a high image quality by sufficiently utilizing the light-diffusing function of the light diffusing member, it is necessary to devise the arrangement of the light-diffusing member.

The light diffusing member must be arranged at a position so that the illuminance of the illuminating light from the LED array becomes uniform. If, for example, the light diffusing member is situated very close to the LED array, the effect of the arrangement of the light diffusing member is not sufficiently provided. To the contrary, if the light diffusing member is in close contact with the back of the transparent sensor substrate, an image signal having a high quality can be obtained by sufficiently utilizing the light-diffusing function of the light diffusing member.

Thus, according to the photoelectric conversion device according to the present embodiment, a uniform image signal output can be obtained even when a black original is read.

In the LED array, a cylindrical lens is usually provided on the LED chips in order to condense light in a direction perpendicular to the array (the subscanning direction) and thus to maintain required illuminance. Hence, if the light diffusing member is situated too close to the LED array, it hinders the effect to condense light by the cylindrical lens, and so there may arise the possibility to reduce the amount of light.

Accordingly, in the photoelectric conversion device of the present invention, it is preferred to dispose the light diffusing member close to the photoelectric conversion element array at a position so that the illuminance of the illuminating light becomes uniform, from the viewpoint of providing a high image quality.

The illuminating light beams L emitted from the light source 3 and having different directional properties according to the positions of the LED arrays become randomly diffused light by the light diffusing plate 7.

Subsequently, the illuminating light L passes through the transparent mounting substrate 2 and an illuminating window defined by an opaque layer on the transparent sensor substrate 1, and illuminates the original P. Information light L' reflected from the original P is incident upon photoelectric conversion elements 8 on the transparent sensor substrate 1, and is subjected to photoelectric conversion. An image signal is output from the photoelectric conversion elements 8.

Figure 6:
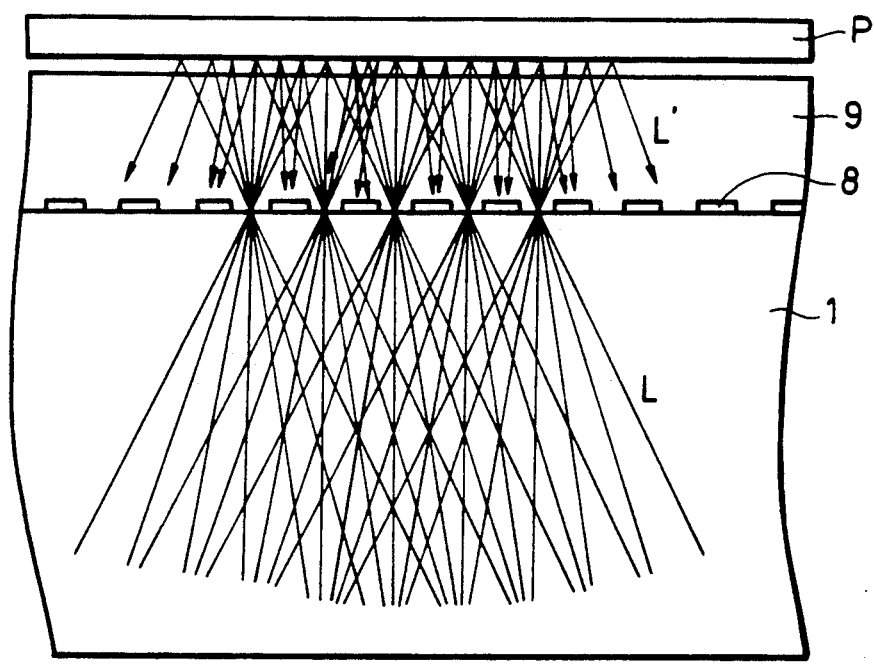
FIG. 6 is a schematic diagram for explaining illuminating light in the photoelectric conversion device according to the present invention.

FIG. 6 shows how information light beams are incident upon the photoelectric conversion elements 8 in the photoelectric conversion device of the present embodiment.

Figure 7:
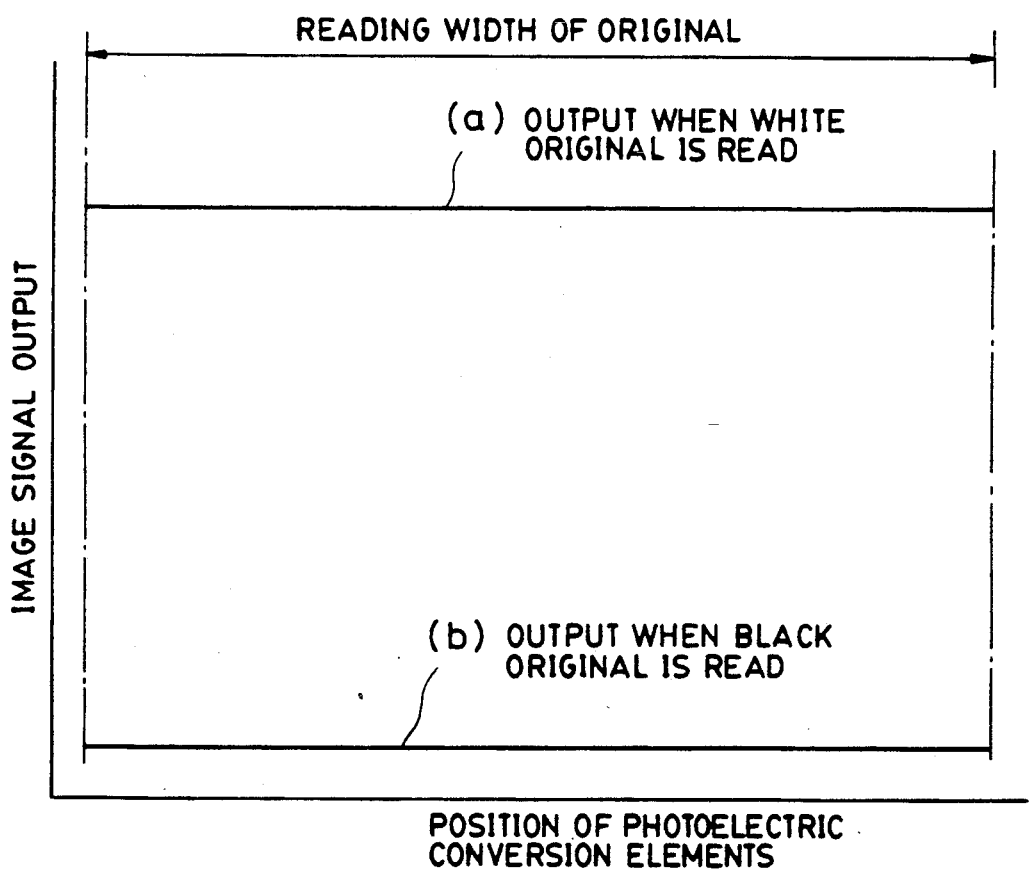
FIG. 7 is a graph for explaining image signal outputs according to the present invention.

FIG. 7 shows image signal outputs from the photoelectric conversion device when a white original and a black original are read by the photoelectric conversion device of the present embodiment.

As described above, since the illuminating light passing through the light diffusing member has a random directional property at all positions in the main-scanning direction, it is possible to obtain diffused light which does not depend on the arranged positions of the LED chips of the LED array at all.

That is, according to the present embodiment, there is no difference between the directional property of the light beams of the light illuminating the image surface of the original situated just above the LED chips and the directional property of the light beams of the light illuminating the surface of the original situated at positions above positions between the adjacent LED chips. Hence, it becomes possible to illuminate the original with illuminating light which has a uniform amount of light beams and a random directional property of light beams over the entire reading width of the original.

Accordingly, although, when a white original is read, a diffused-light component and a specular-reflection-light component are produced as the components of the light reflected from the surface of the white original, there appear no variations in the components of reflected light incident upon the photoelectric conversion elements since the illuminating light which was diffused by the light diffusing means has a uniform amount of light beams and a random diffusing property.

Thus, according to the photoelectric conversion device according to the present embodiment, a very uniform image signal output can be obtained when a white original is read.

Furthermore, although, when a black original is read, only the specular-reflection-light component is emphasized as the component of the light reflected from the surface of the black original, there appear no variations in the components of reflected light incident upon the photoelectric conversion elements since the illuminating light which was diffused by the light diffusing means has a uniform amount of light beams and a random directional property.

Figure 8:
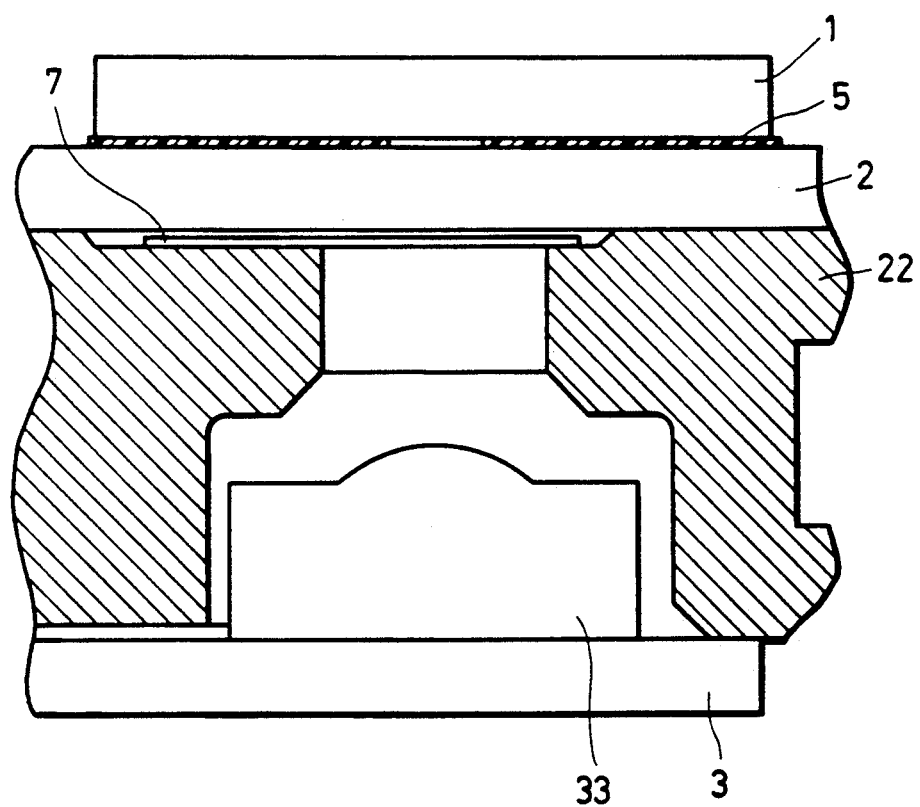
FIG. 8 is a schematic cross-sectional view of a photoelectric conversion device unit according to the present invention.

FIG. 8 is a schematic cross-sectional view showing a configuration in which the photoelectric conversion device of the present invention having the above-described basic configuration is provided as a unit. In the illustrated example, ample, a transparent sensor substrate 1 is bonded on a transparent mounting substrate 2 by an adhesive layer 5, and the transparent mounting substrate 2 is fixed to a base plate 22. A diffusing plate 7 has previously been fixed to the base plate 22. A light source 3 is then fixed to a lower surface of the base plate 22. An image signal can be output from the unit via a flexible interconnection wiring member and a connector (both not illustrated).

Using the sensor unit thus configured, it is possible to configure various kinds of information processing apparatuses, such as a facsilime, an image reader and the like.

Figure 9:
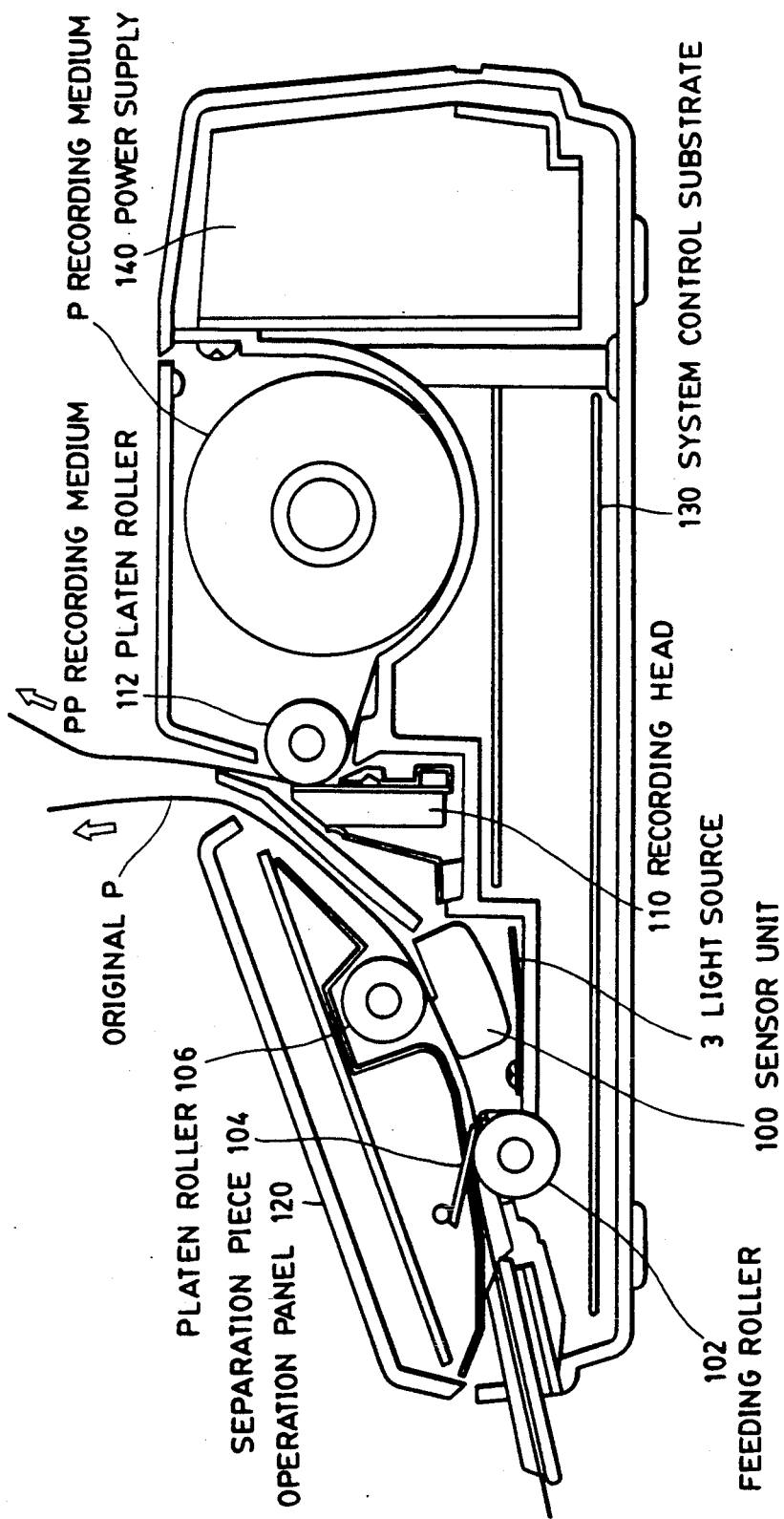
FIG. 9 is a schematic cross-sectional view of an information processing apparatus according to the present invention.

FIG. 9 illustrates a facsimile as an image information processing apparatus which includes the above-described sensor unit. In FIG. 9, a feeding roller 102 feeds an original P toward a reading position. A separation piece 104 securely separates and feeds each sheet of the original P. A platen roller 106 provided at the reading position facing the sensor unit 100 regulates the surface to be read of the original P, and also serves as a conveying means for conveying the original P.

A recording medium PP has the shape of rolled paper in the illustrated example, on which image information read by the photosensor unit or image information transmitted from the outside in the case of a fascimile or the like is formed. A recording head 110 serves as a recording means for performing the above-described image formation. As the recording head 110, a thermal print head, an ink-jet recording head, or various other kinds of heads may be used. Furthermore, the recording head 110 may be of a serial scanning type or a full-line type. A platen roller 112 conveys the recording medium PP to a recording position for the recording head 110 and also regulates the surface to be recorded of the recording medium PP.

An operation panel 120, serving as an input/output means, includes switches for providing operation inputs, display units for indicating messages, states of the apparatus and the like, and other units.

A system control substrate 130, in which controllers, serving as control means are provided, includes, for example, a control unit for controlling respective units, driving circuitry for the sensor unit, a process unit for image information, a tranceiver unit, and the like. A power supply 140 supplies the apparatus and the sensor unit with electric power.

As explained above, according the present embodiment, in a photoelectric conversion device comprising a transparent substrate provided with a plurality of photoelectric conversion elements on its surface facing an original from which image information is to be read, and a light source, in which a plurality of light-emitting sources are arranged, provided at the side of the surface of the transparent substrate opposite to the surface facing the original, wherein light emitted from the light source illuminates the original after passing through the substrate and the reflected light is incident upon the photoelectric conversion elements, it is possible to prevent variations in an image signal output when a black original is read and to perform multi-gradation reading by proving a light diffusing member between the photoelectric conversion elements and the light source.

A second embodiment of the present invention will now be explained in detail with reference to the drawings.

A photoelectric conversion device according to the second embodiment of the present invention will be explained by reference to FIGS. 10(A) and 10(B).

Figure 10:
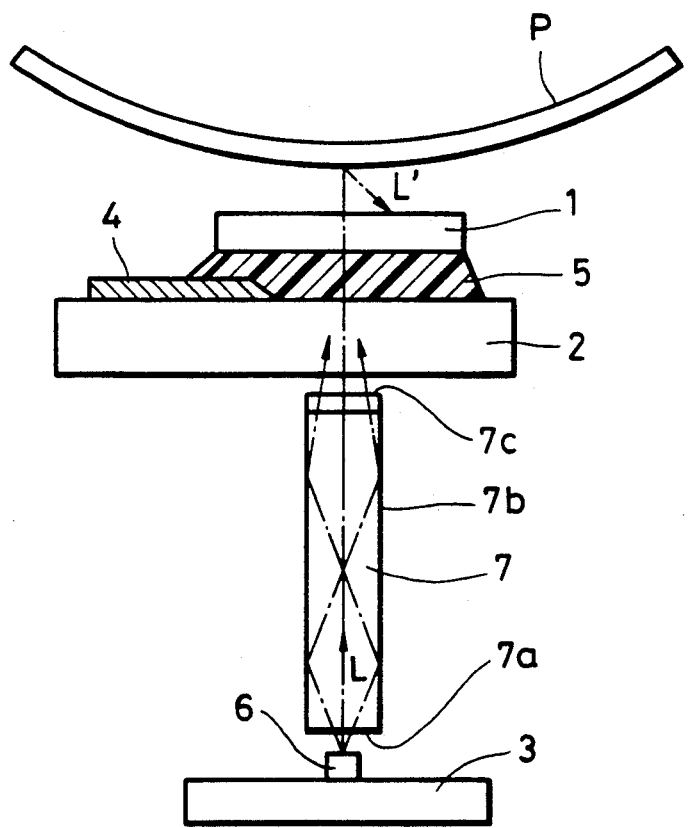
FIGS. 10(A) and 10(B) are schematic cross-sectional views of another photoelectric conversion device according to the present invention.
Figure 10:
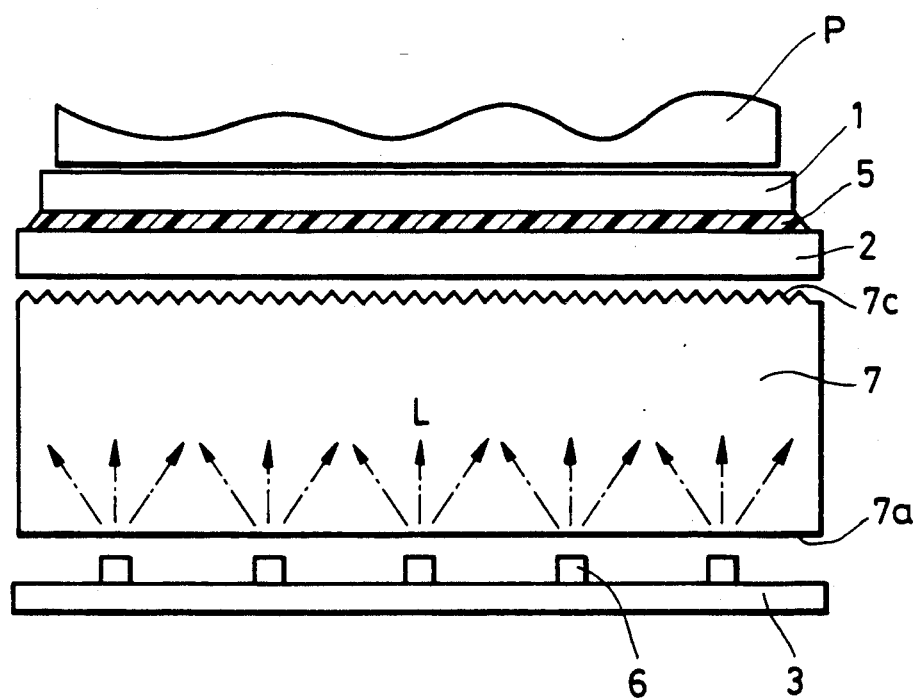

FIG. 10(A) is a schematic cross-sectional view of the device of the second embodiment, as seen from the main-scanning direction of a photoelectric conversion element array. FIG. 10(B) is a schematic cross-sectional view of the device of the second embodiment, as seen from the subscanning direction of the photoelectric conversion element array.

In FIGS. 10(A) and 10(B), a transparent sensor substrate 1 includes a photoelectric conversion element array formed on a transparent and insulating substrate made of fused quartz, silica glass, borosilicate glass or the like by a semiconductor process or the like.

A transparent mounting substrate 2 includes an interconnection wiring member 4, made of Ag, Ag-Pd, Ag-Pt, Au or the like formed by a thick-film printing method, or Al, Cu, Mo, ITO (indium-tin oxide) or the like formed by a thin-film forming method and photolithography, provided on a transparent and insulating substrate made of fused quartz, silica glass, borosilicate glass, soda glass, acrylic resin (which may be provided with a protective layer made of $SiO_2$ or the like for preventing elution and diffusion of alkali elements) or the like.

The interconnection member 4 connects the photoelectric conversion element array to a driving circuit unit (not shown). The transparent sensor substrate 1 is bonded on the transparent mounting substrate 2 by an adhesive layer 5. For the adhesive layer 5, a transparent adhesive of a room-temperature-curable, heat-curable or photo-curable type or the like, made of a silicone-type, acryl-type, epoxy-type resin or the like may be suitably used. A material having coefficient of thermal expansion and refractive index which are close to those of each of the transparent sensor substrate 1 and the transparent mounting substrate 2 is used. The transparent sensor substrate 1 and the interconnection member 4 on the transparent mounting substrate 2 are electrically connected together using wire bonding, soldering or the like.

A light source 3 is a pseudo-linear light source comprising an LED array in which a plurality of light-emitting sources consisting of LED chips 6 are linearly arranged.

The reading position of the original P, the arranged position of an illuminating window (not shown) in the transparent sensor substrate 1 and the optical axis of the light source 3 are set to positions which exist within a vertical plane descending from the reading position of the original P.

As described above, in a pseudo-linear light source such as an LED array or the like, directional properties of illuminating light beams are different between positions just above light-emitting sources such as LED chips and positions above positions between adjacent light-emitting sources.

A light-guiding means 7, disposed between the photoelectric conversion element array on the transparent sensor substrate 1 and the light source 3, efficiently and uniformly guides illuminating light L emitted from the light source 3 to the surface of the original while reducing unevenness in illuminating light beams.

The light-guiding means 7 has a length which nearly corresponds to the length of the light source 3 and the photoelectric conversion element array in the main-scanning direction, has the shape of a rectangular cross section longer in the main-scanning direction, and is made of a material, such as acrylic resin or the like. On an exit surface 7c of the light-guiding means 7, a large number of fine grooves extending in a direction nearly perpendicular to the direction of arrangement of the LED chips 6 are regularly formed as light scattering means.

Illuminating light L emitted from the light source 3 enters from an incident surface 7a, facing the light surce 3, of the light-guiding means 7 into the light-guiding means 7. A part of the entered light L proceeds within the light-guiding means 7 while performing total reflection at side 7b of the light-guiding means 7, and reaches the exit surface 7c on which the fine grooves are formed. Since the large number of fine grooves are regularly formed on the exit surface 7c, the light beams of the illuminating light L are diffused in the direction of arrangement of the LED chips 6, in other words, in the main-scanning direction of the photoelectric conversion element array, by the grooves. At this time, the light beams are hardly diffused in a direction perpendicular to the direction of arrangement of the LED chips 6, in other words, in the subscanning direction of the photoelectric conversion element array.

The diffused light beams then pass through the transparent mounting substrate 2 and the transparent sensor substrate 1, and illuminate the original P. Information light L′ reflected from the original P is incident upon the photoelectric conversion elements on the transparent sensor substrate 1, and an image signal is output from the photoelectric conversion elements.

The photoelectric conversion device of the present embodiment having the above-described configuration has the following effects:

(1) Since the illuminating light proceeds within the light-guiding means while repeating total reflection, illuminance is not decreased, and unevenness in illuminance can also be reduced.

(2) Since the light beams of the illuminating light are diffused in the main-scanning direction by the fine grooves at the exit surface of the light-guiding means, unevenness is not produced in the directional property of the light beams.

The effects of the photoelectric conversion device of the present embodiment will be explained by reference to FIGS. 11(A) and 11(B).

Figure 11:
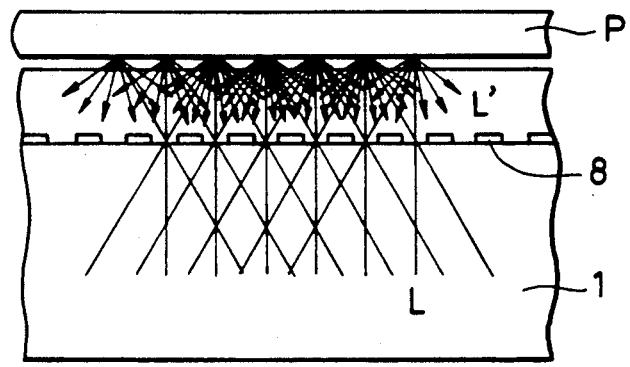
FIGS. 11(A) and 11(B) are schematic diagrams for explaining illuminating light in the photoelectric conversion device according to the present invention.
Figure 11:
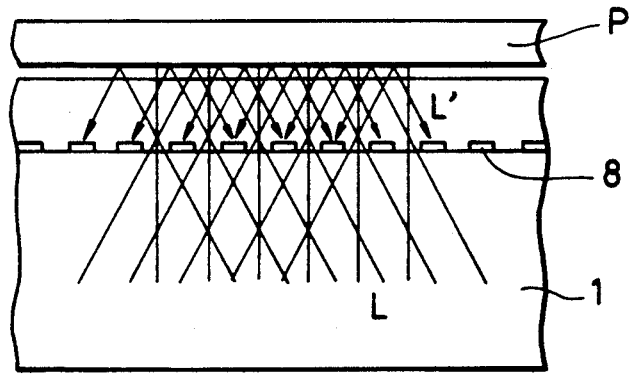

As shown in FIG. 11(A), when a white original P is read by the photoelectric conversion device of the present embodiment, illuminating light L has a random diffusing property and a nearly uniform illuminance. Hence, although a diffused-light component and a specular-reflection-light component are produced as the components of the light L' reflected from the surface of the white original, the component of the reflected light L' incident upon each photoelectric conversion element 8 becomes uniform. Accordingly, a uniform and large output signal (larger photocurrent) can be obtained from the photoelectric conversion elements 8.

As shown in FIG. 11(B), when a black original is read by the photoelectric conversion device of the present embodiment, only a very small amount of a specular-reflection component which is reflected without being absorbed on the surface of the original is produced as the component of the light L' reflected from the surface of the black original. However, since the illuminating light L has a random diffusing property and a nearly uniform illuminance, the component of the reflected light L' incident upon each photoelectric conversion element 8 is uniform. Accordingly, a uniform and small output signal (smaller dark-current) can be obtained from the photoelectric conversion elements 8.

Figure 12:
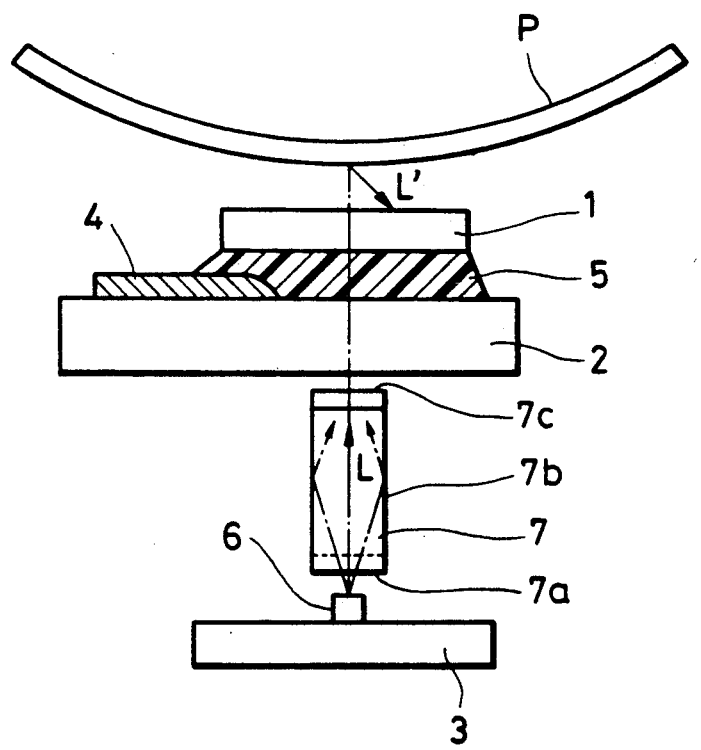
FIGS. 12(A) and 12(B) are schematic cross-sectional views of still another photoelectric conversion device according to the present invention.
Figure 12B:
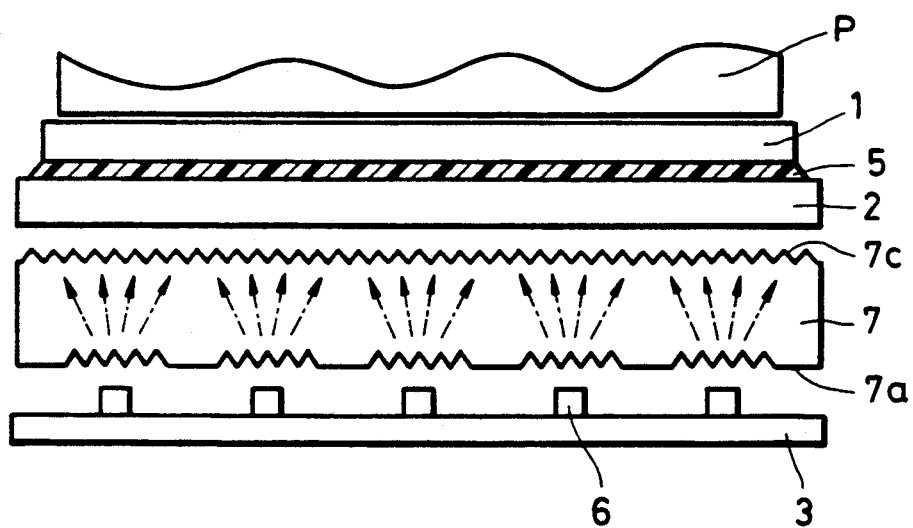

FIGS. 12(A) and 12(B), showing a third embodiment of the present invention, are cross-sectional views schematically showing a photoelectric conversion device of the embodiment. FIG. 12(A) is a schematic cross-sectional view of the device as seen from the main-scanning direction of a photoelectric conversion element array. FIG. 12(B) is a schematic cross-sectional view of the device as seen from the subscanning direction of the array.

The third embodiment differs from the second embodiment in that the length of the light-guiding means 7 in the direction of the optical axis is smaller, and a large number of grooves, serving as light-scattering means, extending in a direction nearly perpendicular to the direction of arrangement of the LED chips 6 are partially provided also on the incident surface 7a of the light-guiding means 7.

In order to provide a small photoelectric conversion device, it is desired to make the length of the light-guiding means 7 in the direction of the optical axis as small as possible. However, if the length of the light-guiding means 7 is merely shortened in the structure of the second embodiment, there is the possibility of the occurrence of unevenness in illuminance and in the directional property of light beams. In order to obtain a uniform illuminance by repeating total reflection within the light-guiding member 7, a certain amount of length is needed. Furthermore, if a uniform illuminance cannot be obtained at the exit surface 7c of the light-guiding member 7, diffused light may not be obtained in some cases even if grooves are provided on the exit surface 7c.

In the third embodiment, by providing the large number of grooves extending in a direction nearly perpendicular to the direction of arrangement of the LED chips 6 on portions above the LED chips on the incident surface 7a of the light-guiding surface 7a, illuminating light emitted from the LED chips 6 is diffused in the main-scanning direction at the incident surface 7a of the light-guiding member 7. The illuminating light diffused at the incident surface 7a proceeds while performing total reflection within the light-guiding member 7. Where a uniform illuminance is obtained, the illuminating light is diffused again in the mainscanning direction by the grooves provided on the exit surface 7c.

Accordingly, even if the length of the light-guiding member 7 in the direction of the optical axis is small, illuminance on the surface of the original is uniform, and unevenness in the directional property of the light beams is not produced.

Although, in the second and third embodiments, the large number of grooves provided on the incident surface and the exit surface of the light-guiding means have the shape of triangular cross-sections, the shape of the grooves is not limited thereto. Any shape capable of realizing the technical concept of the present invention may be adopted. The shape of a sine-curve may, for example, be adopted. In this case, however, it is desirable that the length of one period be as fine as the above-described grooves.

The partial arrangement of the grooves on the incident surface of the light-guiding means depends on the arranged position of the plurality of light-emitting sources, directivity of the emission, and the like. Accordingly, the grooves may be formed not only on positions near just above the light-emitting sources, as in the third embodiment, but also on other positions.

The present invention is of course not limited to the above-described embodiments, but various changes and modifications may be made within the scope of the invention.

FIG. 13 is a schematic cross-sectional view of a transparent sensor substrate, serving as a photosensing unit, according to the present embodiment, as seen from the main-scanning direction of a photoelectric conversion element array. On a transparent glass substrate 11 are formed a matrix interconnection wiring member 12 by thin-film forming method, an illuminating window 13, photoelectric conversion elements 14, charge storage members 15 and thin-film transistors (TFTs) 16 for transferring stored electric charges with a proper timing. Each of these elements is formed by an identical production process by sequentially stacking layers of a light-tight lower electrode 17 made of Cr, an insulating layer 18 made of SiN, a photoconductive layer 19 made of a-Si:H as non-single crystalline Si, an ohmic-contact layer 20 made of n+-type a-Si:H and an upper electrode 21 made of Al on the glass substrate 11.

The photoelectric conversion elements 14, the charge storage members 15, the TFTs 16 and the like are coated with a passivation layer 22 made of SiN, on which a protective layer 24 made of a thin glass plate is provided via an adhesive layer 23 made of epoxy resin.

The thin glass plate 24 has the function as an antifriction layer for protecting the photoelectric conversion elements 14 and the like from friction with the original P, and the function as a spacer for maintaining the distance between the original P and the photoelectric conversion elements 14 constant.

In such a configuration, illuminating light L emitted from a light source 4 provided at the side of the surface of the transparent sensor substrate 1 opposite to the original P illuminates the original P after passing through the transparent sensor substrate 1. Information light L' reflected from the original P is incident upon the photoelectric conversion elements 14.

The photoelectric conversion devices according to the second and third embodiments may be applied to the image information processing apparatus (for example, a facsimile) shown in FIG. 9 or the like.

Since such an information processing apparatus has the same configuration as that described above, an explanation thereof will be omitted.

When reading was performed illuminating originals using the devices according to the first through third embodiments mounted on the apparatus shown in FIG. 9, very stable and uniform reading could be performed.

As explained above, according to the second and third embodiments, in a photoelectric conversion device comprising a substrate provided with a plurality of photoelectric conversion elements on the surface facing an original from which image information is to be read and a light source in which a plurality of light-emitting sources are arranged, wherein light emitted from the light source illuminates the original and light reflected therefrom is incident upon the photoelectric conversion elements, by providing a light-guiding means between the photoelectric conversion elements and the light source, and by providing a large number of grooves extending in a direction crossing, more preferably, substantially perpendicular to the direction of arrangement of the light source on at least one of an incident surface and an exit surface of the light-guiding means, as optical-axis changing means for the illuminating light, it is possible to realize an inexpensive and small photoelectric conversion device while making illuminance on the original large and uniform.

Furthermore, according to the present invention, it is possible to provide a photoelectric conversion device capable of performing a stable and uniform reading operation.

What we claim is:

1. A photoelectric conversion device comprising:
   a photosensor comprising a plurality of photoelectric conversion elements and a substrate having a transparent portion for transmitting light for illuminating an original bearing information and provided with said plurality of photoelectric conversion elements; and
   a light source for emitting light for illuminating the original in which a plurality of light-emitting sources are arranged, said device further comprising:
   light diffusing means between said photosensor and said light source.

2. A photoelectric conversion device according to claim 1, wherein said light diffusing means diffuses light in a direction of arrangement of said plurality of photoelectric conversion elements.

3. A photoelectric conversion device according to claim 1, wherein said light diffusing means comprises a transparent member having uneven surface.

4. A photoelectric conversion device according to claim 1, wherein said light diffusing means comprises a transparent member having projections and recesses whose pitches are irregular.

5. A photoelectric conversion device according to claim 1, wherein said light diffusing means comprises a transparent member having projections and recesses whose pitch is regular.

6. A photoelectric conversion device according to claim 1, wherein said light diffusing member comprises a transparent member having projections and recesses made of grooves extending in a direction crossing a direction of arrangement of said light-emitting sources.

7. A photoelectric conversion device according to claim 1, wherein said light diffusing means comprises projections and recesses provided on a light-incident side and on a light-exit side of a transparent member.

8. A photoelectric conversion device according to claim 1, wherein said photosensor includes electric-charge storage elements and switching elements.

9. A photoelectric conversion device according to claim 1, wherein said substrate of said photosensor is provided on another transparent substrate including a driving circuit.

10. A photoelectric conversion device according to claim 1, wherein said light-emitting sources comprise light-emitting diodes.

11. A photoelectric conversion device according to claim 1, wherein said light source includes a condenser-lens member.

12. A photoelectric conversion device according to claim 1, wherein each of said photoelectric conversion elements includes a layer made of a non-single-crystalline material including silicon.

13. A photoelectric conversion device according to claim 12, wherein said non-single-crystalline material consists of amorphous silicon.

14. An information processing apparatus comprising the photoelectric conversion device according to claim 1, conveying means for conveying an original, and control means for controlling said photoelectric conversion device and said conveying means.

15. An information processing apparatus according to claim 14, further comprising recording means.

16. An information processing apparatus according to claim 15, wherein said recording means comprises an ink-jet recording head for performing recording by discharging ink utilizing thermal energy.

* * * * *

UNITED STATES PATENT AND TRADEMARK OFFICE
CERTIFICATE OF CORRECTION

PATENT NO. : 5,101,285
DATED : March 31, 1992
INVENTOR(S) : TATSUNDO KAWAI, ET AL.

It is certified that error appears in the above-identified patent and that said Letters Patent is hereby corrected as shown below:

On title page, item

[56] References Cited

U.S. Patent Documents, "3,544,713 12/1070 Case et al." should read --3,544,713 12/1970 Case et al.--

COLUMN 2

Line 27, "much" should read --many--.

Line 30, "much" should read --many--.

Line 34, "pseuodo-linear" should read --pseudo-linear--.

COLUMN 3

Line 37, "cnversion" should read --conversion--.

Line 42, change "with" to --or--.

COLUMN 4

Line 13, "lumunated" should read --luminated--.

COLUMN 8

Line 29, "ample" should be deleted.

Line 40, "facsilime" should read --facsimile--.

Line 54, "fascimile" should read --facsimile--.

UNITED STATES PATENT AND TRADEMARK OFFICE
CERTIFICATE OF CORRECTION

PATENT NO. : 5,101,285

DATED : March 31, 1992

INVENTOR(S) : TATSUNDO KAWAI, ET AL.

It is certified that error appears in the above-identified patent and that said Letters Patent is hereby corrected as shown below:

COLUMN 9

Line 5, "tranceiver" should read --transceiver--.

Line 22, "proving" should read --providing--.

COLUMN 10

Line 35, "surce" should read --source--.

COLUMN 11

Line 68, "light-guiding surface 7a", should read --light-guiding member 7--.

COLUMN 12

Line 7, "mainscanning" should read --main scanning--.

UNITED STATES PATENT AND TRADEMARK OFFICE
CERTIFICATE OF CORRECTION

PATENT NO. : 5,101,285                    Page 3 of 3
DATED      : March 31, 1992
INVENTOR(S): TATSUNDO KAWAI, ET AL.

It is certified that error appears in the above-identified patent and that said Letters Patent is hereby corrected as shown below:

COLUMN 14

Line 5, "uneven" should read --an uneven--.

Line 15, "said light diffusing member" should read --said light diffusing means--.

Signed and Sealed this

Fifth Day of July, 1994

Attest:

BRUCE LEHMAN

*Attesting Officer*     Commissioner of Patents and Trademarks